(12) United States Patent
Wang et al.

(10) Patent No.: US 11,385,374 B2
(45) Date of Patent: Jul. 12, 2022

(54) BOREHOLE DISPERSIVE WAVE PROCESSING WITH AUTOMATIC DISPERSION MATCHING FOR COMPRESSIONAL AND SHEAR SLOWNESS

(71) Applicant: HALLIBURTON ENERGY SERVICES, INC., Houston, TX (US)

(72) Inventors: Ruijia Wang, Singapore (SG); Chung Chang, Houston, TX (US); Gary W. Kainer, Tomball, TX (US); JoonShik Kim, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 370 days.

(21) Appl. No.: 16/070,232

(22) PCT Filed: Mar. 28, 2017

(86) PCT No.: PCT/US2017/024596
§ 371 (c)(1),
(2) Date: Jul. 13, 2018

(87) PCT Pub. No.: WO2017/172810
PCT Pub. Date: Oct. 5, 2017

(65) Prior Publication Data
US 2019/0025452 A1 Jan. 24, 2019

Related U.S. Application Data

(60) Provisional application No. 62/317,282, filed on Apr. 1, 2016.

(51) Int. Cl.
*G01V 1/50* (2006.01)
*G01V 1/48* (2006.01)
(Continued)

(52) U.S. Cl.
CPC ............... *G01V 1/50* (2013.01); *E21B 49/00* (2013.01); *G01V 1/46* (2013.01); *G01V 1/48* (2013.01);
(Continued)

(58) Field of Classification Search
CPC ... G01V 1/50; G01V 1/48; G01V 1/46; G01V 2210/43; G01V 2210/582; G01V 2210/6224; E21B 49/00
See application file for complete search history.

(56) References Cited

U.S. PATENT DOCUMENTS 4,698,793 A * 10/1987 Wu ........................... G01V 1/48
702/6
5,278,805 A 4/1994 Kimball
(Continued)

FOREIGN PATENT DOCUMENTS

CN 104316961 B * 4/2017 ............... G01V 1/28

OTHER PUBLICATIONS

Z. Zhang and et al, "Robust estimation of shear slowness from quadrupole mode in LWD environment", The 18th Formation Evaluation Symposium of Japan, Sep. 27-28, 2012 (Year: 2012).*
(Continued)

*Primary Examiner* — Douglas Kay
(74) *Attorney, Agent, or Firm* — Polsinelli PC

(57) ABSTRACT

Disclosed are systems and methods for processing acoustic logging information with automatic dispersion matching. The method comprises obtaining, from an acoustic logging tool, acoustic waveforms from within a borehole, applying dispersion analysis to the acoustic data to extract a slowness-frequency response, calculating a slowness density log of the slowness-frequency response, obtaining an initial shear slowness estimate based on the slowness density, generating a dispersion model comprising model parameters, and per-
(Continued)

forming a dispersion response auto match inversion to minimize the difference between the slowness-frequency response and the dispersion model in order to obtain a final shear slowness estimate.

17 Claims, 13 Drawing Sheets

(51) Int. Cl.
  *G01V 1/46* (2006.01)
  *E21B 49/00* (2006.01)
(52) U.S. Cl.
  CPC .... *G01V 2210/43* (2013.01); *G01V 2210/582* (2013.01); *G01V 2210/6224* (2013.01)

(56) References Cited

U.S. PATENT DOCUMENTS

| | | | |
|---|---|---|---|
| 7,120,541 B2 | 10/2006 | Wang | |
| 7,643,374 B2 | 1/2010 | Plona et al. | |
| 7,698,066 B2 | 4/2010 | Huang et al. | |
| 8,374,799 B2 * | 2/2013 | Ivosev | H01J 49/4265 702/23 |
| 8,456,952 B2 | 6/2013 | Tang et al. | |
| 8,560,248 B2 * | 10/2013 | Ivosev | H01J 49/4265 702/23 |
| 2005/0254343 A1 | 11/2005 | Saiki et al. | |
| 2006/0120217 A1 * | 6/2006 | Wu | G01V 1/44 367/32 |
| 2008/0027650 A1 * | 1/2008 | Huang | G01V 1/48 702/13 |
| 2008/0144439 A1 | 6/2008 | Plona et al. | |
| 2010/0085835 A1 * | 4/2010 | Tang | G01V 1/30 367/32 |
| 2011/0202287 A1 * | 8/2011 | Ivosev | H01J 49/4265 702/23 |
| 2012/0201096 A1 * | 8/2012 | Valero | G01V 1/44 367/81 |
| 2013/0124104 A1 * | 5/2013 | Ivosev | H01J 49/0036 702/23 |
| 2014/0086009 A1 | 3/2014 | Yoneshima | |
| 2015/0049585 A1 * | 2/2015 | Collins | G01V 1/50 367/35 |

OTHER PUBLICATIONS

B. Mandal, "Borehole Acoustic-Array Processing using Model-Based Adaptive Filtering", SEG San Antonio 2011 Annual Meeting (Year: 2011).*

International Search Report and Written Opinion; PCT Application No. PCT/US2017/024596; dated Jul. 10, 2017.

* cited by examiner

BOREHOLE DISPERSIVE WAVE PROCESSING WITH AUTOMATIC DISPERSION MATCHING FOR COMPRESSIONAL AND SHEAR SLOWNESS

CROSS-REFERENCE TO RELATED APPLICATIONS

This application is a national stage entry of PCT/US2017/024596 filed Mar. 28, 2017, which claims priority to U.S. Provisional Application No. 62/317,282 filed Apr. 1, 2016, said application is expressly incorporated herein in its entirety.

TECHNICAL FIELD

The present technology pertains to the processing of acoustic logging information, and more specifically to acoustic logging information processing with automatic dispersion matching.

BACKGROUND

Borehole acoustic logging tools are employed for a variety of purposes related to formation measurement and characterization. In general, acoustic logging tools measure different dispersive borehole wave modes propagating along the longitudinal borehole axis, and analyze the dispersions of target wave modes in order to determine various geophysical and mechanical properties of the formation through which the particular borehole passes. More particularly, dispersions characterize the relationship between wave slowness and wave number/frequency, and can be used to provide insight into various material and geometric properties of the borehole and surrounding formation, such as profiles of rock formation shear slowness and stress distributions around the borehole. In some cases, a particular type of wave may be of interest—for example, the aforementioned profiling of rock formation shear wave slowness is based on an analysis of flexural waves and screw waves.

It is often very difficult to extract accurate information from raw borehole waveform data. Numerous factors can cause significant noise and interference that contaminates the target modes. These factors include, for example, wave scattering due to the borehole radius changing, strong formation anisotropy, and non-suppressed tool waves. In some borehole environments, such as deep water reservoirs and shallow reservoirs, acoustic signals can be very weak, while other environments might present strong formation anisotropy. In general, strong formation heterogeneity invalidates conventional processing and analysis methods, as these methods all assume a homogeneous formation wherein formation slowness does not change along the borehole axis.

Most borehole wave modes, such as flexural waves and screw waves, share similar characteristics in that their low-frequency asymptotes approach the shear slowness of the surrounding formation. For example, the flexural wave slowness approaches the shear wave slowness at low frequencies. However, the excitation amplitude of many target wave modes at their low-frequency asymptotes is close to zero However, these low frequency asymptotes provide reliable speed information of the surrounding formation, and cannot simply be ignored. In order to obtain a measurement of the surrounding formation shear slowness, one must extract and process the shear slowness information from these low frequency asymptotes of received borehole waveforms. Therefore, it is desirable provide a robust and fully data-driven method to extract the asymptotic slowness from target dispersive borehole modes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
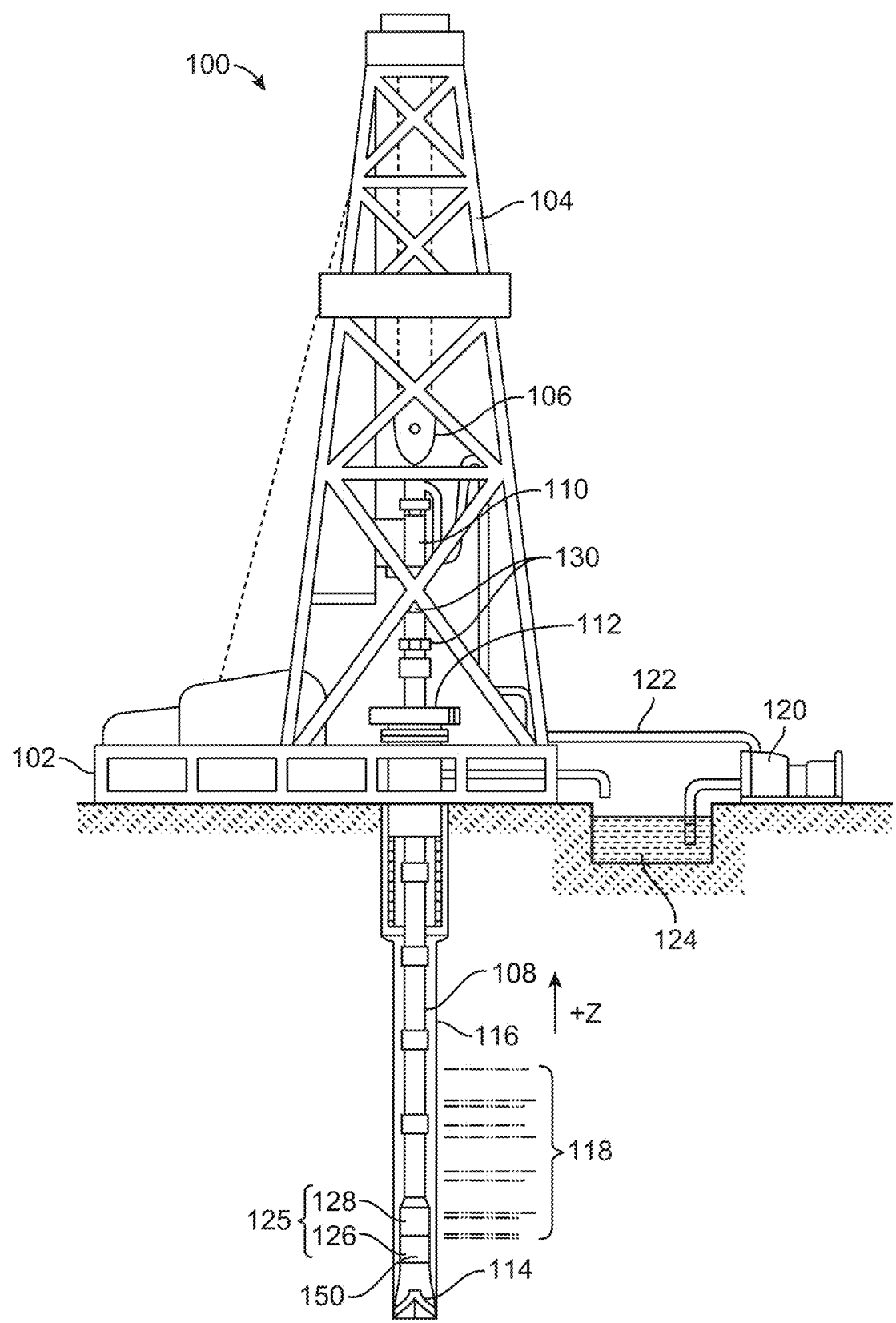
FIG. 1 illustrates a diagrammatic view of an example logging-while-drilling (LWD) wellbore operating environment.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

Various types of acoustic guided waves can be generated and measured in a fluid-filled borehole, with the specific type of wave depending upon factors such as formation type and source type. For example, in a fast formation, a monopole source may excite a borehole refracted P-wave (primary wave), a borehole refracted S-wave (shear wave), a pseudo-Rayleigh wave of different orders, or a Stoneley wave. In a slow formation, a monopole source may excite a refracted P-wave, a leaky-P-wave, or a Stoneley wave. In another example, a dipole source in a fast formation may excite a borehole refracted P-wave, a borehole refracted S-wave, or flexural waves of different orders. A quadrupole source may excite a borehole refracted P-wave, a borehole refracted S-wave, or a screw wave.

Many borehole waves are dispersive, including flexural waves excited by a dipole source; pseudo-Rayleigh waves, leaky-P waves, and Stoneley waves excited by a monopole source; and screw waves excited by a quadrupole source. Additionally, with many borehole waves, the low-frequency asymptotic slowness of the borehole dispersion will approach a formation body wave slowness value. At this value, the excitation amplitude of the borehole dispersion is close to zero, making direct analysis difficult or impossible.

As such, conventional processing methods rely upon indirect approaches to estimate the formation slowness at low frequencies. For example, these methods might process only high-frequency slowness values by using a time-domain semblance method, and then proceed to estimate the shear slowness by applying a dispersion correction. However, these dispersion correction methods assume an ideal borehole free of complications, and actual borehole environments are quite complicated and typically render such estimates inaccurate. Many factors may strongly affect the borehole wave dispersions, such as borehole alternations, formation anisotropy, stress concentrations, fractures, breakouts and so forth. For a realistic borehole, the extracted slowness results are often under corrected or over corrected by the dispersion correction method.

To overcome the handicaps of conventional dispersion wave processing methods, disclosed are a system, method, and computer-readable device for extracting formation body wave slowness from borehole dispersion responses. This disclosure is fully data driven and thus has no dependence on a model. Further, the present disclosure is automatically adaptive to different cases, such as complicated borehole environments with alternations, formation anisotropy and/or stress concentrations. The method can be used in any type of formation to extract formation shear slowness values from dipole flexural waves or quadrupole screw waves, and to extract formation compressional slowness values of leaky-P waves excited by either a dipole or monopole source.

Assuming an ideal flexural wave without any influence from noise, tool and other modes, it is possible to extract the true shear slowness by the time-domain semblance/coherence processing with a low-frequency filter. However, such an approach is inadequate because the filter will be different for different formations and different size boreholes. In addition, the low-frequency part of the flexural dispersions is often biased by the noise, reflected flexural waves or other modes. Therefore, processing the low-frequency flexural wave signals in the time domain may result in biased shear slowness. Thus, it is preferable to utilize a full-frequency spectrum inversion by matching a simplified theoretical dispersion response and the dispersion measurements extracted from the dipole array waveforms in the frequency domain. Since the inversion is made in the frequency domain, the approach is more flexible than the conventional time-domain method and it can be automatically adaptive to different types of boreholes and formations. Furthermore, the high-frequency signals are fully utilized to constrain the stability of the inversion and to decrease the influences of noise and other-modes at low-frequency.

Data Collection

The disclosure now turns to FIG. 1, which illustrates a diagrammatic view of an exemplary logging while drilling (LWD) and/or measurement while drilling (MWD) wellbore operating environment 100 in which the present disclosure may be implemented. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom-hole assembly 125, the logging tools 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 3 in order to perform acoustic (e.g., "sonic") logging. The telemetry sub 128 may include wireless telemetry or logging capabilities, or both, such as to transmit or later provide information indicative of received acoustic energy/waveforms to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In some embodiments, one or more of the logging tools 126 may communicate with a surface receiver 130, such as a wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 2:
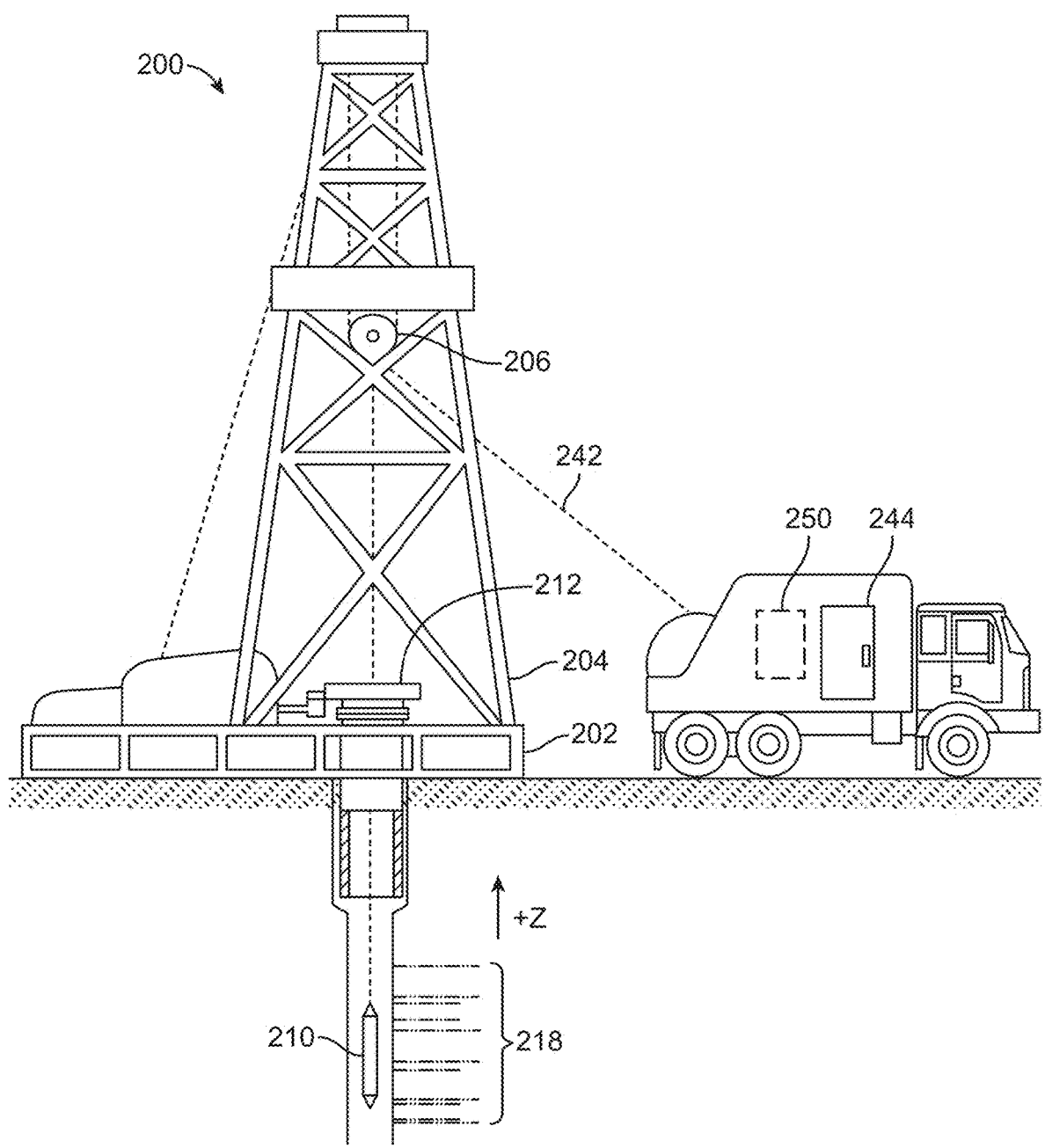
FIG. 2 illustrates a diagrammatic view of an example wireline logging (WL) wellbore operating environment.

FIG. 2 illustrates a diagrammatic view of a conveyance logging wellbore operating environment 200 in which the present disclosure may be implemented. As depicted in FIG. 2, a hoist 206 may be included as a portion of a platform 202, such as that coupled to derrick 204, and used with a conveyance 242 to raise or lower equipment such as acoustic logging tool 210 into or out of a borehole. Acoustic logging tool 210 may include, for example, tools such as the one shown in FIG. 3. A conveyance 242 may provide a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 244 may include a computing device 250 capable of carrying out the methods and techniques of the present disclosure. In this manner, information about the formation 218 may be obtained by acoustic logging tool 210 and processed by a computing device, such as computing device 250. In some embodiments, computing device 250 is equipped to process the received information in substantially real-time, while in some embodiments, computing device 250 can be equipped to store the received information for processing at some subsequent time.

Figure 3:
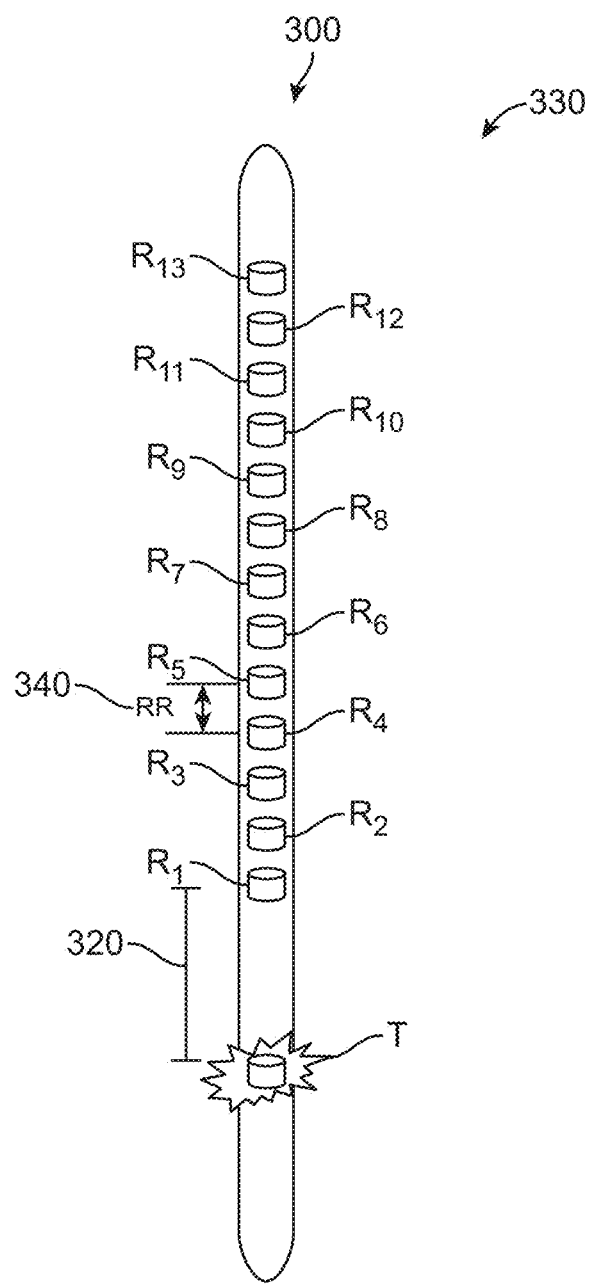
FIG. 3 illustrates a diagrammatic view of an acoustic logging tool.

FIG. 3 illustrates a diagrammatic view of an acoustic logging tool 300 capable of performing the presently disclosed methods and techniques in accordance with certain exemplary embodiments of the present disclosure. As depicted in FIG. 3, acoustic logging tool 300 includes at least one transmitter, T, capable of exciting acoustic signals/waves of different azimuthal orders, although additional transmitters may be provided as desired. In some embodiments, transmitter T can be a multipole source. Acoustic logging tool 300 further includes a receiver array 330 comprising a number of receivers, illustrated here as thirteen receivers $R_1$-$R_{13}$. The receivers may be evenly spaced along logging tool 300, or may be arranged in other patterns as desired. As illustrated, receivers $R_1$-$R_{13}$ are evenly spaced with a spacing 340 of 0.5 feet, similar to the Xaminer® Sonic Image Tool (XSI), available from Halliburton Energy Services, Inc.

As illustrated, transmitter T is separated from the first receiver $R_1$ by a spacing 320, illustrated here as approximately nine feet. The large-span receiver array is capable of capturing an acoustic wave field of different azimuthal orders. In such an acoustic logging tool 300, the axial resolution of slowness logs can vary with different sub-array processings. Generally, the axial resolution of an extracted slowness curve is between the receiver to receiver spacing and the array size, which may be from about 0.5 feet to about 6 feet, depending on the size of the sub array.

Figure 4:
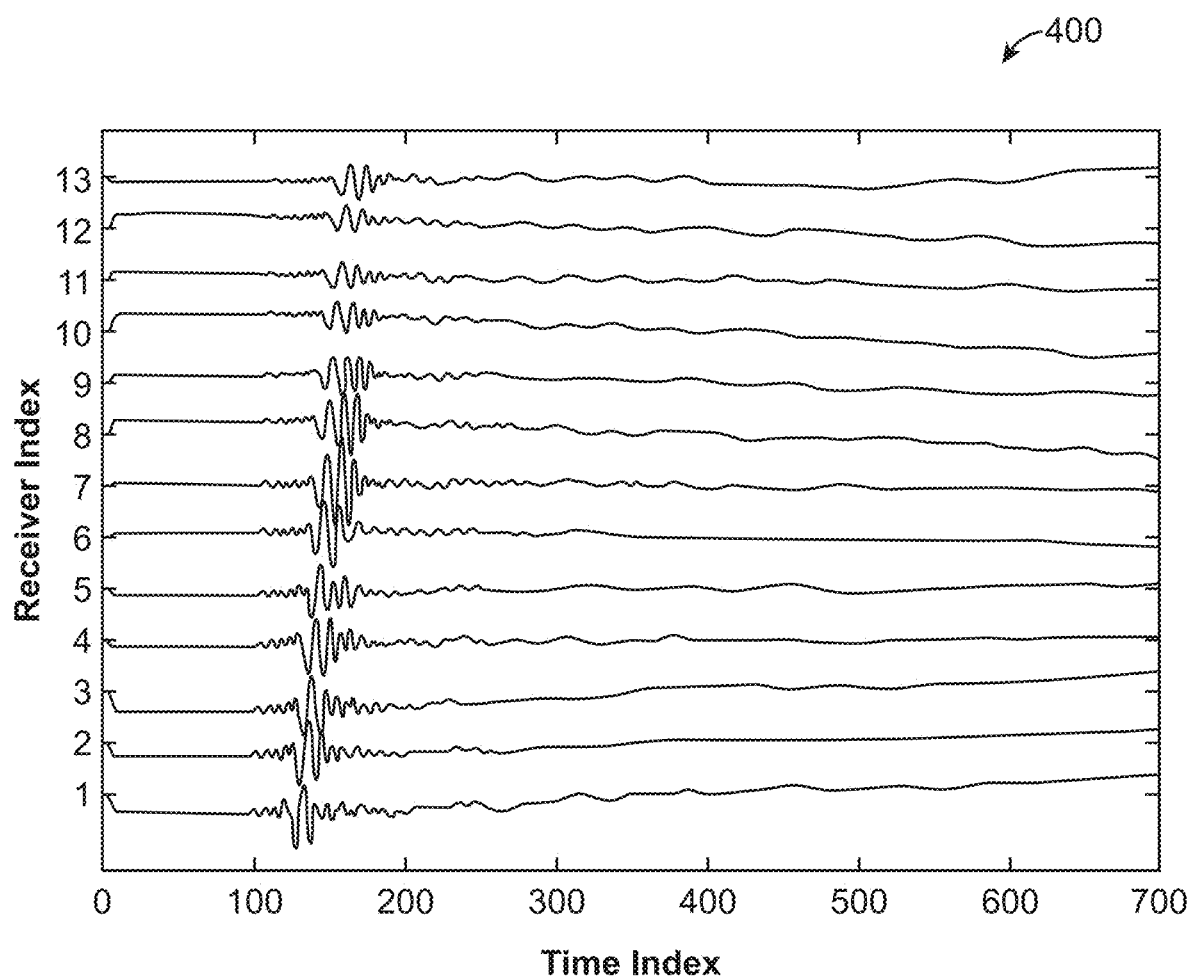
FIG. 4 illustrates example waveform trains of a single depth acquisition.

FIG. 4 depicts exemplary waveform trains 400 of a single depth acquisition as recorded by the thirteen receivers of the acoustic logging tool 300 of FIG. 3. At some time index less than 0, transmitter T generated an acoustic wave in a borehole. The acoustic wave then propagates along the borehole, through the transmitter-receiver separation 320, before first reaching receiver $R_1$, as indicated by the fact that receiver $R_1$ is the first to record waveform data. The same acoustic wave continues onward, past receivers $R_2$-$R_{13}$, where it is recorded in turn. Note that, while these 13 waveforms are all a consequence of the same original acoustic wave, they are not identical, with each waveform train containing variations induced by formation properties (desirable) and noise (un-desirable). Additionally, it is noted that waveform trains 400 are representative of a hard formation case, although it is understood that waveform data collected in other formation cases may also be utilized.

Waveform and Slowness Analysis

In one embodiment of the present disclosure, raw waveforms (such as waveform trains 400) are measured or otherwise received as input waveforms. However, input waveforms received from typical acoustic logging tools, such as acoustic logging tool 300 of FIG. 3, are almost always measured in the time domain. While this representation is often more intuitive for humans to understand, time domain signals lack the analytical flexibility that can be achieved in the frequency domain. For example, a given set of input waveforms may consist of waveforms measured in different areas of a borehole, where each waveform is associated with slightly different formation and borehole characteristics. Each waveform might be associated with a different cut-off frequency (i.e., the frequency at which the dispersion curve of the waveform starts to be distinguished from formation shear slowness), making it difficult or impossible to construct and apply a unified filter to the set of input waveforms. Consequently, the input waveforms can be subjected to pre-processing, including a transformation from the time domain to the frequency domain:

$$XX(f)=FFT[wave(t)] \quad (1)$$

where FFT represents a Fast Fourier Transform operation, wave(t) denotes the time domain signals of the input waveforms, and XX(f) represents the frequency domain spectrum of the transformed waveforms.

Once the frequency domain spectrum of the transformed waveforms has been obtained, the slowness-frequency response of the waveforms can then be obtained using a multi-channel dispersion analysis known in the art. In some embodiments, a Differential Phase Frequency Semblance (DFPS) analysis can be employed to extract a 2D coherence/semblance frequency-slowness map from the transformed waveforms.

Figure 5:
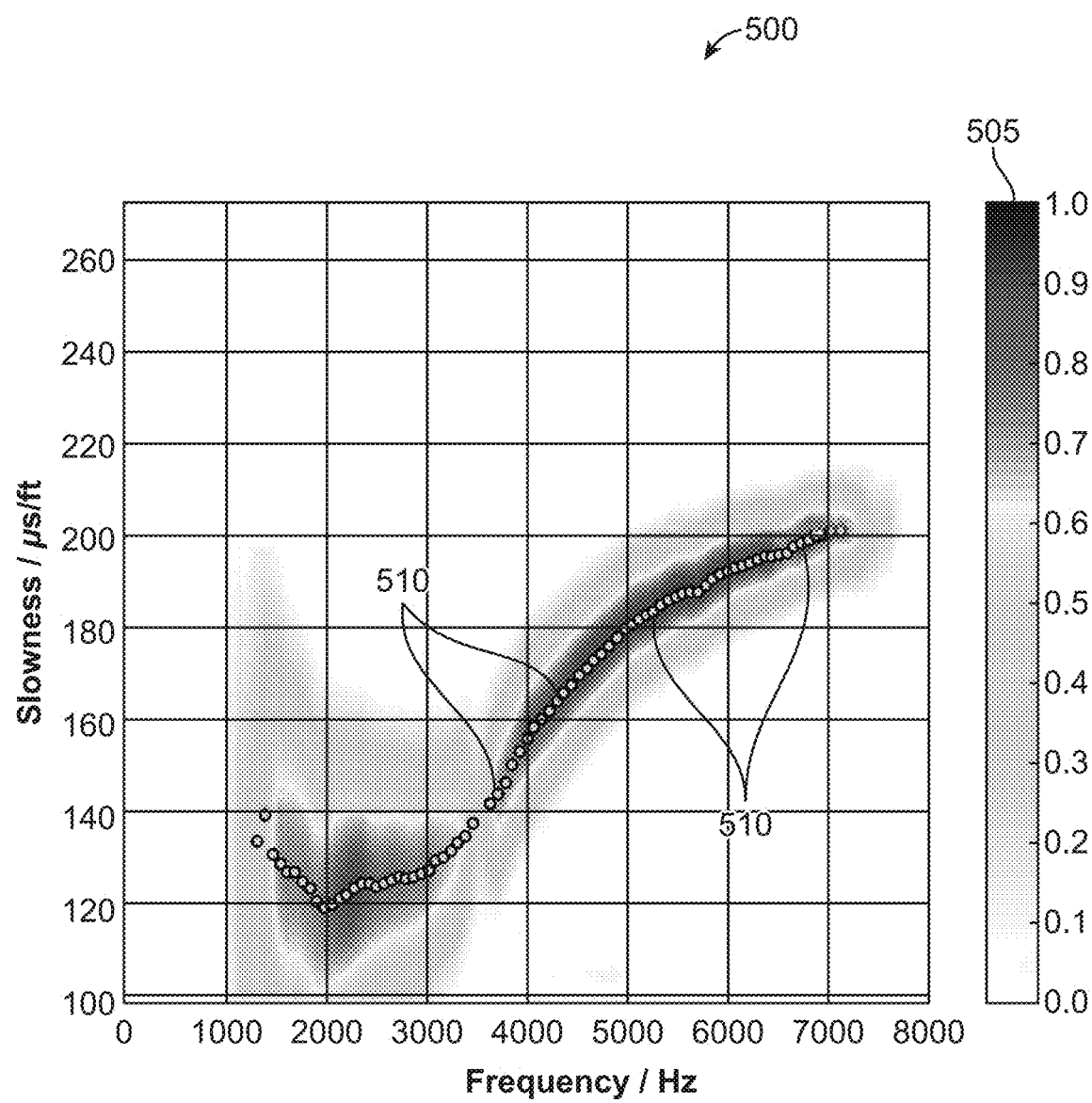
FIG. 5 illustrates a 2D coherence/semblance frequency-slowness map.

FIG. 5 illustrates a 2D coherence/semblance frequency-slowness map 500 extracted from the frequency domain spectrum XX(f) of the transformed waveforms from Equation (1) by a DFPS analysis. A coherence/semblance scale 505 indicates the coherence/semblance value at various frequency-slowness value pairs seen in frequency-slowness map 500, where the coherence/semblance value is a measure of the amount of similarity between adjacent seismic or waveform traces. Frequency-slowness map 500 is additionally overlaid with a series of picked slowness values 510, represented here as a series of circular points. The picked slowness values are selected such that they correspond to the local coherence/semblance maximum at each frequency f that is contained within the frequency domain spectrum XX(f), as may be visually confirmed with reference to coherence/semblance scale 505.

In an idealized scenario and environment, it would be possible to extract a shear slowness estimate (or the shear slowness asymptote) directly from the dispersion response indicated by the picked values 510. However, in real-world scenarios and environments, such an approach is impossible because low-frequency responses are highly influenced by noise and non-target modes, as can be observed in coherence/semblance map 500 by way of the wide spread of the coherence/semblance values between 1 and 3 kHz (compare this to the tight spread of the coherence/semblance values between 4 kHz and 8 kHz). Thus, picking the shear slowness directly from the dispersion response indicated by the values 510 will result in a biased, and therefore incorrect, shear slowness estimate.

Instead, it is noted that picking the local coherence/semblance maximum for each frequency f provides a dispersion response that corresponds to the modal frequency response of the mode waves for the borehole model, and as such can then be used to invert for an optimized shear slowness value.

The disclosed inversion process can be used to obtain the shear slowness asymptote, and therefore, can be used to obtain an optimized shear slowness value from the dispersion response indicated by the picked values 510. To do so, the dispersion response is first projected into the slowness axis by applying a mapping function as follows:

$$\rho(s)=\Sigma coh(s'), s' \in (s-ds, s+ds) \quad (2)$$

where s' represents the dispersion curve points 510 and coh(s) represents the conference values indicated with color in FIG. 5 (ranging between 0 and 1) at the positions of the circles. Therefore coh(s') represents the local maximum coherence/semblance values corresponding to the picked slowness values 510, (s−ds, s+ds) indicates a slowness window ds around the input target slowness s, and p(s) denotes a slowness density log that indicates the slowness intensity of the dispersion at each slowness grid.

To calculate ρ(s), the slowness grid is first constructed. A computing frequency range ($f_{min}$, $f_{max}$) is determined using a qualified coherence/semblance amplitude and known model parameters, thereby defining the horizontal width of a grid box. A qualified coherence/semblance amplitude indicates a dataset with a coherence/semblance value that is larger than a pre-determined threshold, and the known model parameters may include compressional slowness, mud slowness, and borehole radius. A target slowness value s is then selected, and a window ds is opened around either side of the target slowness value s. As such, a grid box is constructed to enclose ($f_{min}$, $f_{max}$) and (s−ds, s+ds) for each given target slowness value s. The slowness density log ρ(s) is then computed by taking a summation of the semblance/coherence values located inside the grid box defined for each target slowness value s in the desired slowness range.

Figure 6:
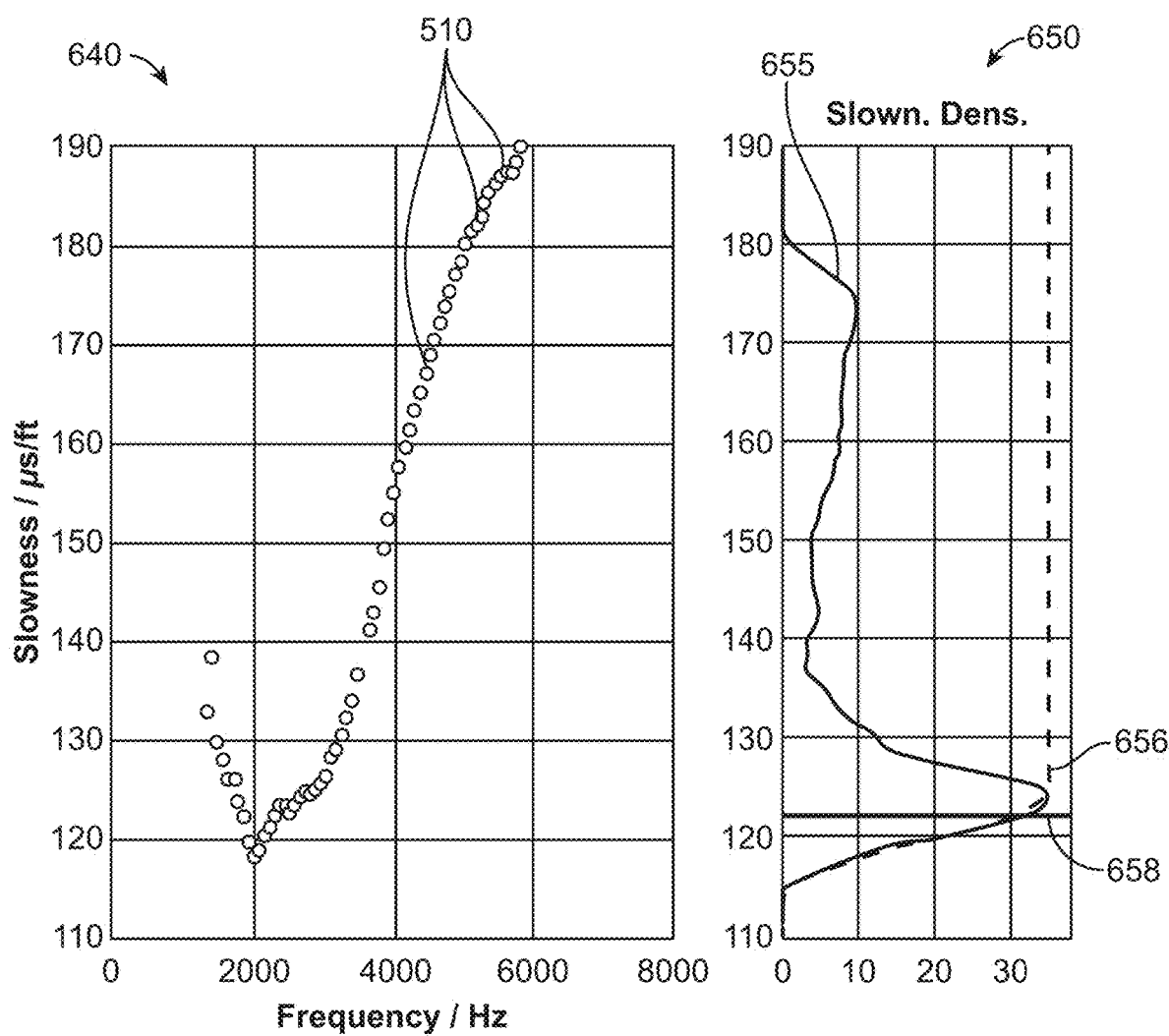
FIG. 6 illustrates a graph of a slowness density log calculated from a 2D coherence/semblance frequency-slowness graph.

FIG. 6 illustrates a graph 650 of a slowness density log 655 calculated from 2D coherence/semblance frequency-slowness map 500 as ρ(s) of Equation (2). On the left is a graph 640 of the dispersion response indicated by the picked points 510 (i.e. a graph of coherence/semblance map 500 that has been rescaled and has the coherence/semblance values removed)

It should be noted that low-frequency dispersions will be located in close proximity to the shear slowness asymptote and are most likely to be horizontal and changing slowly. As discussed previously, the frequency range of 1-3 kHz is associated with the greatest noise and spread in coherence/semblance values. As such, the semblance/coherence sums of these low-frequency dispersion responses contribute to a first local maximum 656 in the slowness density log 655. It is noted that the slowness value associated with first local maximum 656 does not correspond to the true shear slowness of the formation. Instead, the modeled dispersion response has biased the peak to a slightly higher value. For example, as shown in slowness density log 655, the true shear slowness value of the formation is located at the leading edge of the peak, along line 658. It is therefore desirable to locate the first local maximum 656 and then pick the shear slowness at the leading edge of this peak. A technique for picking the shear slowness and fitting the edge is described below, and it is noted that the dotted line in graph 650 indicates the edge fitting results.

Advantageously, calculating slowness density log 655 has reduced this edge picking problem to a 1D picking problem, whereas it would otherwise have been a more complex and difficult 2D picking problem in 2D coherence/semblance map 500. In some embodiments, an edge fitting technique is used, although it is understood that various peak picking and shear slowness picking methods known in the art can also be employed without departing from the scope of the present disclosure.

With the edge fitting method, the edge associated with the first local maximum 656 is located by tracking the first local maximum in the slowness density log 655 and a fitting range is determined as follows:

$$s_{max}=s_{peak} \quad (3)$$

$$s_{min}=\alpha s_{peak} \quad (4)$$

where $s_{peak}$ denotes the slowness value associated with the first local maximum 655, $s_{max}$ and $s_{min}$ are the slowness fitting maximum and minimum respectively, and a is an empirical parameter associated with the acoustic logging tool. In some embodiments, it may be found that α=0.9.

Once the fitting range is determined, a fitting operation can then be performed to minimize the misfit between an edge of slowness density log 655 and the edge fitting function within the fitting range:

$$mis(\beta) = \sum_{s_{min}}^{s_{max}} [f(s,\beta) - \rho(s)]^2 \qquad (5)$$

$$f(s,\beta) = \rho(s_{max})\cos^2(s_{max}\beta - s\beta) \qquad (6)$$

where mis (β) denotes the misfit, β denotes a fitting parameter, $s_{min}$ and $s_{max}$ are the slowness fitting range of Equations (3) and (4), p(s) is the slowness density log of Equation (2), and f (s, β) denotes the fitting function of Equation (6). Next, the shear slowness can be picked based on the fitting operation:

$$s_{shear,edge} = s_{max} - l/\beta \qquad (7)$$

where l is an empirical parameter obtained using field data for different tool structures or using a monopole shear value in an isotropic formation to calibrate out any slowness difference. For example, in some embodiments, the value of l might be between 0.25 and 0.8, with different values in this range chosen for different formations and different tools. After applying the correct empirical parameter l, the true shear slowness is extracted by this edge fitting method. Advantageously, the shear slowness picking result at the edge $S_{shear,edge}$ is accurate and stable.

This edge fitting method utilizes the distribution of the slowness frequency response at low frequencies (because the local maximum 656 of slowness density log 655 occurs at low frequencies), and because the edge fitting method uses only the leading edge, it is unlikely to be adversely affected by Stoneley mode residuals (which have a smaller slowness value) that may still exist in the waveforms. In this sense the use of only the low frequencies is advantageous. However, the higher frequencies present contain information typically of a much higher quality, having less uncertainty and a better signal to noise ratio (SNR) as compared to the low frequency signals. As such, it is desirable to make use of these high frequency signals, for example, to constrain the picking and inversion.

Accordingly, a dispersion auto match is disclosed, utilizing a new simplified dispersion model and a model-data driven-inversion procedure. A comprehensive dispersion model of borehole flexural waves can be described as follows:

$$D(s_{shear}, R, Den_{formation}, s_{mud}, Den_{mud}, Ani, Inv, s_{comp}, f, \ldots) \qquad (8)$$

where R indicates borehole radius, $Den_{formation}$ indicates formation density, $s_{mud}$ gives mud slowness, $Den_{mud}$ gives mud density, Ani encompasses various anisotropy parameters, Inv encompasses various invasion parameters, $s_{comp}$ encompasses formation compressional slowness, and f indicates frequency. It is not practical to adopt Equation (8) in real in the field data processing, as the aforementioned variables will almost certainly be unknown in real time. It is also unpractical to perform forward simulation of the borehole response when so many variables are present, as such a simulation can require far more time and computational capability than are available at a typical field installation.

A more practical and simplified dispersion model is provided by:

$$D(s_{shear}, a, b, f) \qquad (9)$$

where $D(s_{shear}, a, b, f)$ is a dispersion model that introduces two model parameters, a and b, to compensate for the influence of all unknown parameters, including those discussed above with respect to Equation (8). Parameter a is designed to compensate for changes in the frequency axis induced by the unknown parameters, while parameter b is designed to compensate for changes in the slowness axis induced by the unknown parameters. As such, a suitable combination and selection of a and b is possible such that the influences of all unknown parameters in the dispersion responses are compensated for. For real time processing, simplified dispersion models are generated for various types of scenarios from a dispersion library:

$$D(s_{shear}, a, b, f) = bD(s_{shear}, 1, 1, a^*f) + (1-b)s_{shear} \qquad (10)$$

where an unstretched dispersion library $D(s_{shear}, 1, 1, f)$, is calculated with a set of standard borehole parameters and a proper forward modeling method. When the parameters a and b are applied, the dispersion library becomes stretched, or in other words, adapted to cover different scenarios. By using an unstretched dispersion library as the foundation for the computations, more accurate results can be achieved, as the unstretched dispersion library is computed from exact modeling, and is therefore very close to real field data. Taking a shear slowness value of $s_{shear}=120$ us/ft as an example, all potential dispersion responses can be generated by adjusting the model parameters a and b.

Figure 7:
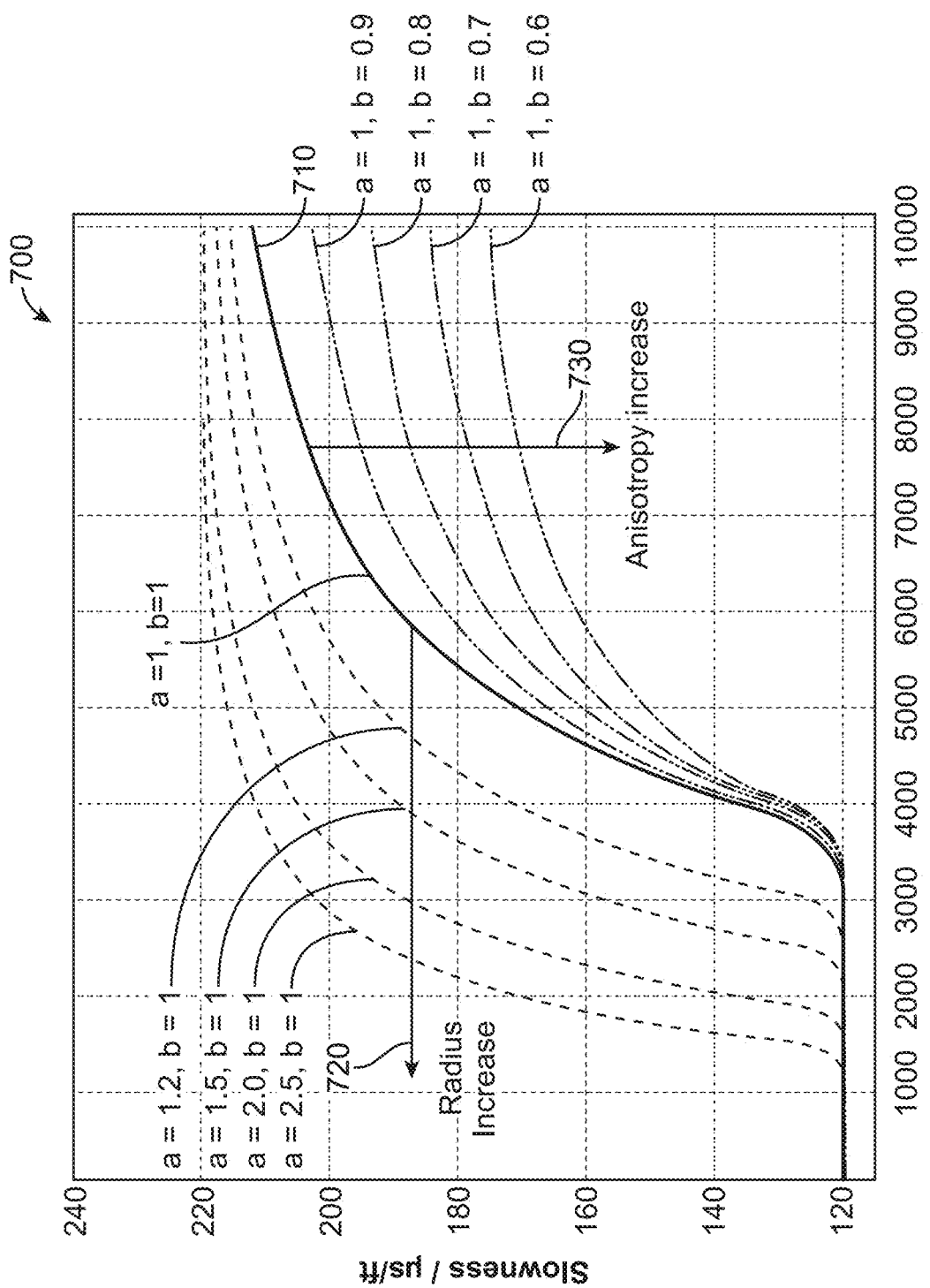
FIG. 7 illustrates a slowness-frequency graph presenting the effecting of adjusting different model parameters for modeling dispersion responses.

The results of such adjustments are illustrated in slowness-frequency graph 700 of FIG. 7. A baseline 710 indicates the response with a and b set to 1. Increasing a to a larger value will shift the dispersion response to the lower frequencies, as indicated by arrow 720, and decreasing b to a smaller value will reduce the high frequency asymptote of the dispersion response. As indicated in FIG. 7, an increase in a can correspond to an increase in borehole radius, and a decrease in b can correspond to an increase in formation anisotropy, although it is understood that the model parameters a and b encompass the influence of all unknown parameters, as explained previously.

To obtain the final shear slowness asymptote, an optimization model is applied to minimize the difference between the extracted dispersion response S(f) seen in graph 640 of FIG. 6 (i.e. the slowness v. frequency curve 510) and the simplified dispersion response $D(s_{shear}, a, b, f)$ of Equation (10):

$$O(s_{shear}, a, b) = \sum_f |D(s_{shear}, a, b, f) - S(f)|^2 \qquad (11)$$

where the shear slowness $s_{shear}$ and model parameters a and b that minimize the objective function $O(s_{shear}, a, b)$ are the desired optimized values. In some embodiments, to stabilize the inversion, an initial guess of the inversion could be determined by a model-based dispersion corrected shear slowness from time-semblance processing. In some embodiments, the initial guess of the inversion could be determined by the shear slowness value $s_{shear,edge}$ from the edge fitting method of Equation (7) and then only the two model parameters a and b need be obtained by minimizing the objective function O(a, b):

$$O(a, b) = \sum_f |D(s_{shear,edge}, a, b, f) - S(f)|^2 \qquad (12)$$

Note that after the optimization, various dispersion response estimates could be obtained by calculating Equation (10) with the parameters $s_{shear}$, a, and b, that were solved for in Equation (11). For example, if the parameters are substituted into a dispersion library that accounts for real-world tool effects, a dispersion response with tool effects will be obtained. Otherwise, if the parameters are substituted into a dispersion library that does not account for real-world tool effects, a dispersion response without tool effects will be obtained. This allows a user to determine the tool effect for the current tool by displaying dispersion estimates with and without tool presence.

Figure 8:
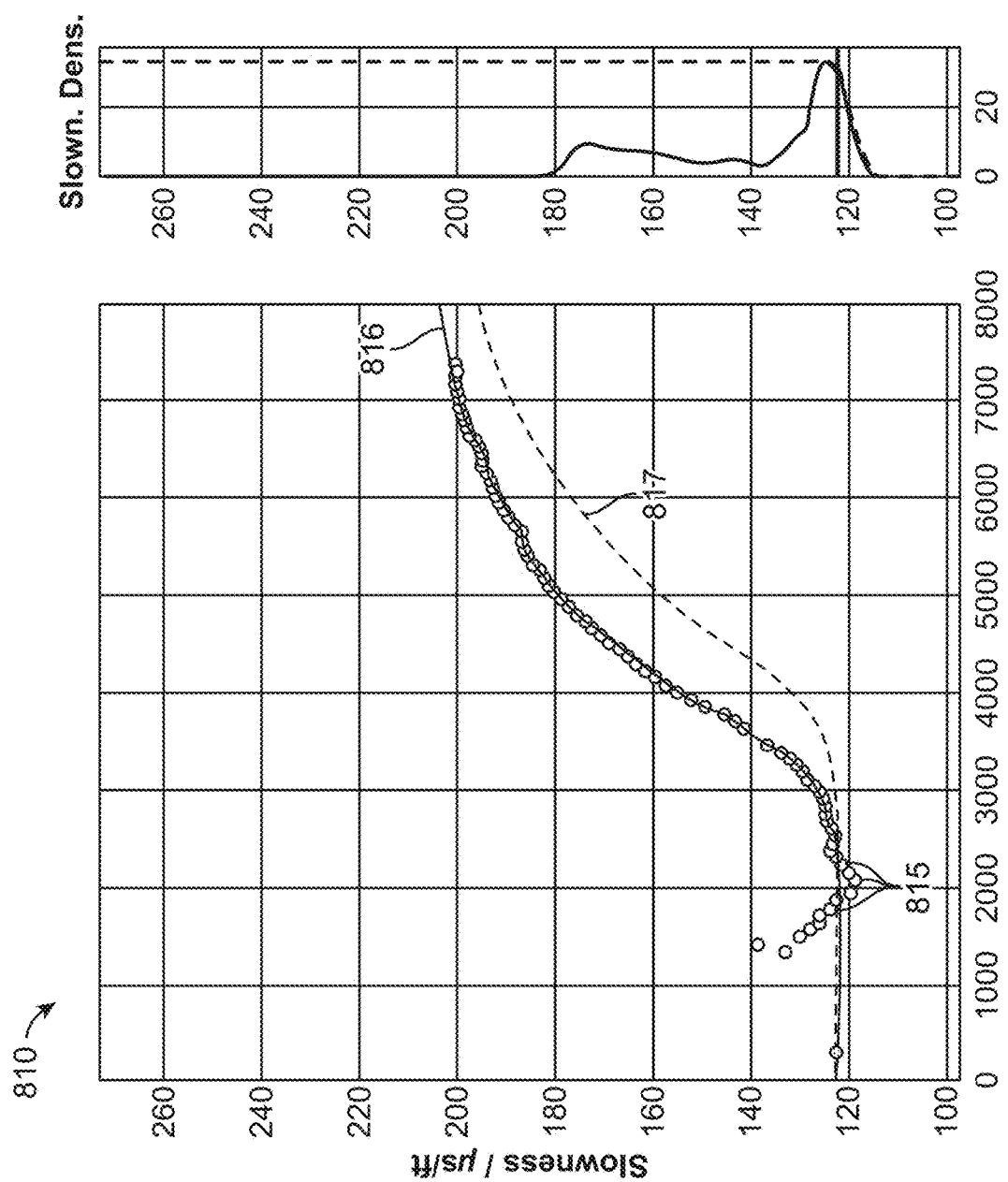
FIG. 8 illustrates the inverted dispersion processing results for waveform data in a hard formation case.

For example, FIG. 8 illustrates the inverted results for the waveform data 400 of FIG. 4, which corresponds to a hard formation case. The inverted results include a graph 810 of a measured dispersion response 815 (individual points) overlaid with a dispersion response 816 (solid line) calculated with tool effects and a dispersion response 817 (dashed line) calculated without tool effects. As seen in graph 810, the calculated dispersion response 816 fits the measured dispersion response 815 very well at all frequencies, including the low-frequency range, indicating that the shear slowness has been accurately inverted. The dispersion response 817 is the dispersion response that would be achieved if the tool structure were entirely acoustically transparent in the fluid-filled borehole. The uncertainty/error of the slowness estimate is indicated by the dot located along the intersection of dispersion response 816 and dispersion response 817 (at approximately 200 Hz).

Figure 9:
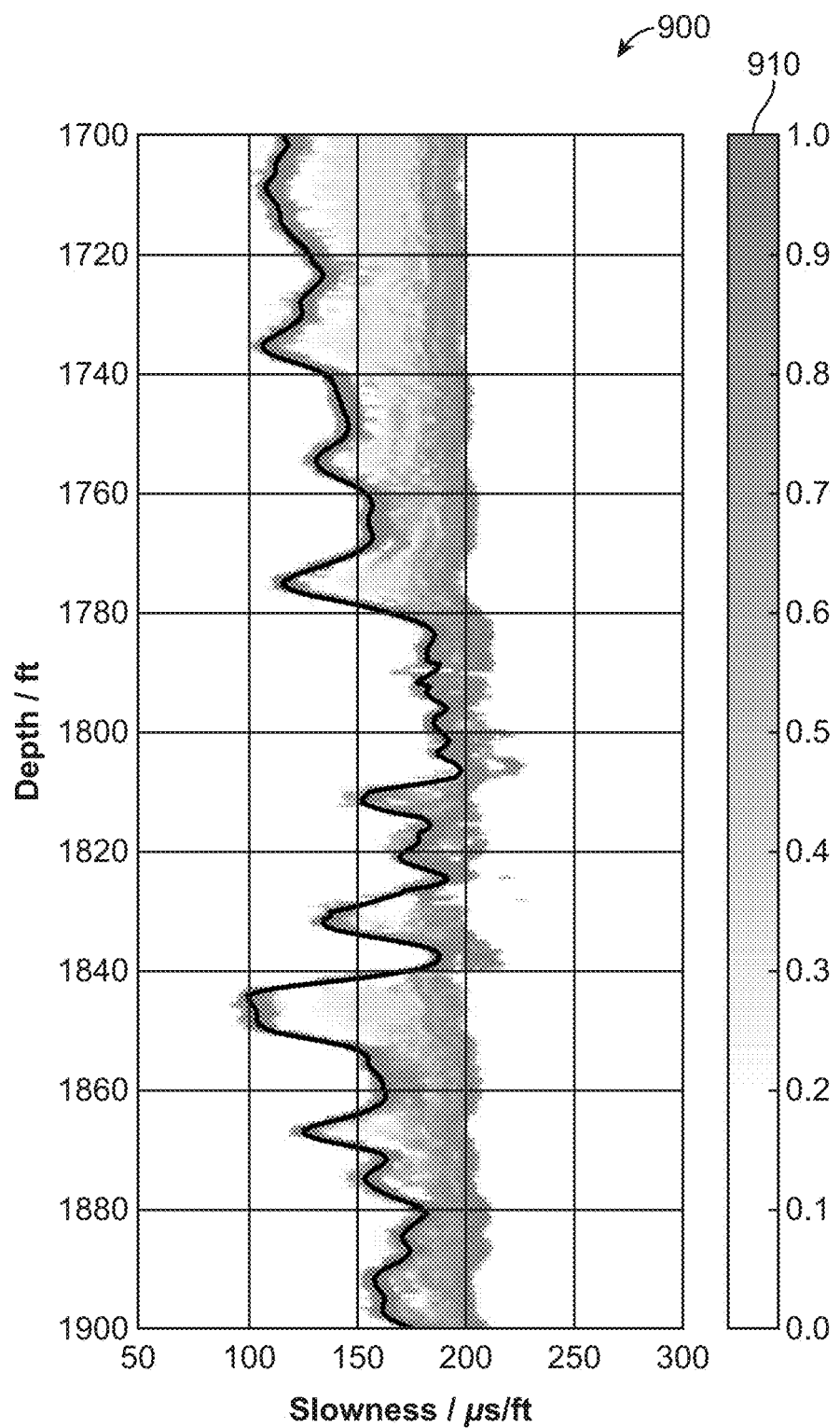
FIG. 9 illustrates a log-scale display of the dispersion processing results of FIG. 8.

FIG. 9 depicts a log-scale display 900 of the dispersion processing results of FIG. 8. FIG. 9 also includes a VDL (variable density log) 910, which is a normalized slowness density log used to validate the formation body wave slowness estimates made by the present disclosure. Note that the shear slowness estimates overlay the leading edge of the VDL, suggesting that the shear slowness is well evaluated near its asymptote.

Figure 10:
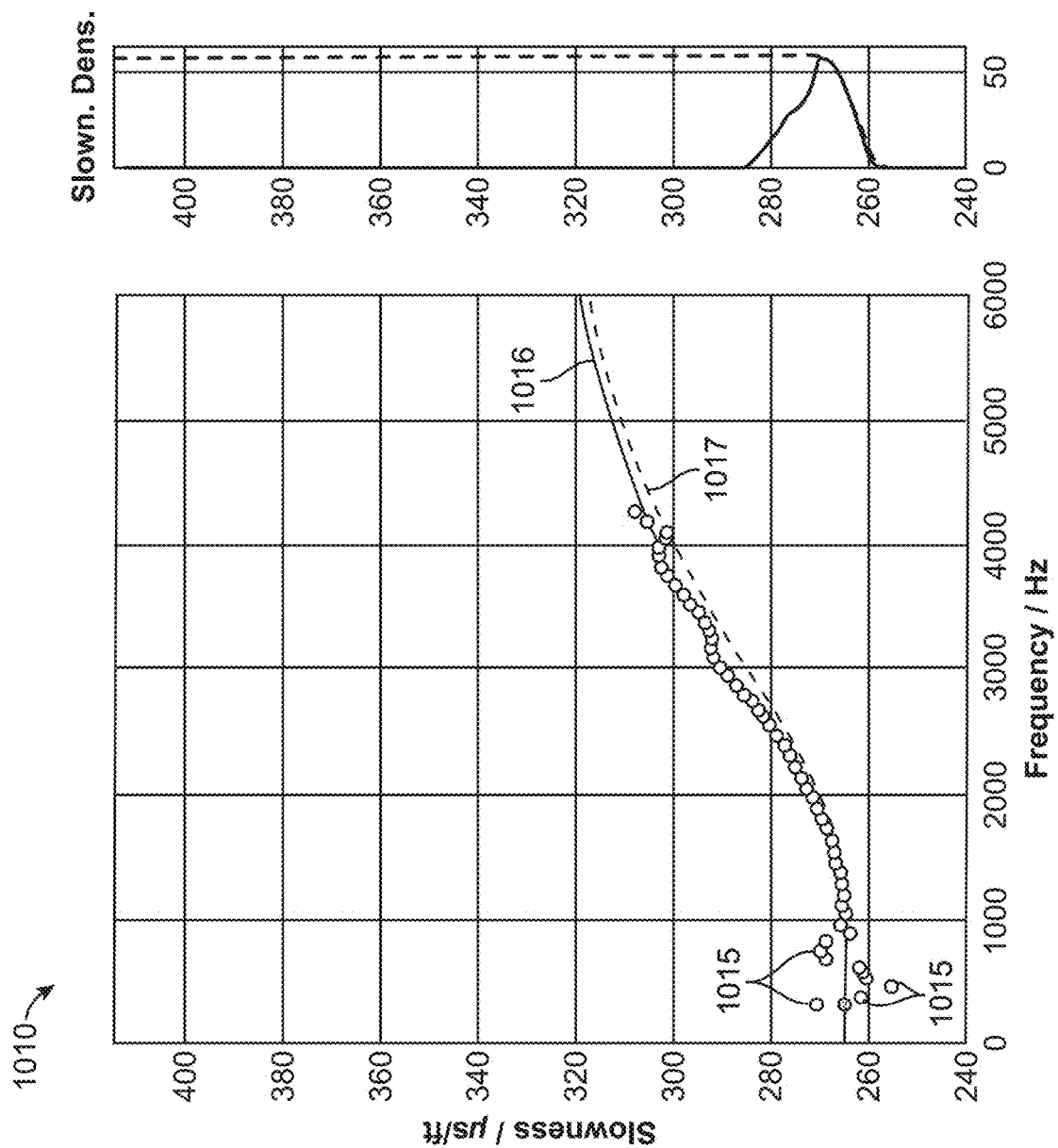
FIG. 10 illustrates the inverted dispersion processing results for waveform data in a soft formation case.

FIG. 10 illustrates the inverted results for waveform data from a soft formation. The inverted results include a graph 1010 of a measured dispersion response 1015 (individual points) overlaid with a dispersion response 1016 (solid line) calculated with tool effects and a dispersion response 1017 (dashed line) calculated without tool effects. As seen in graph 1010, the calculated dispersion response 1016 fits the measured dispersion response 1015 very well at all frequencies, including the low frequency range, indicating that the shear slowness has been accurately inverted.

Figure 11:
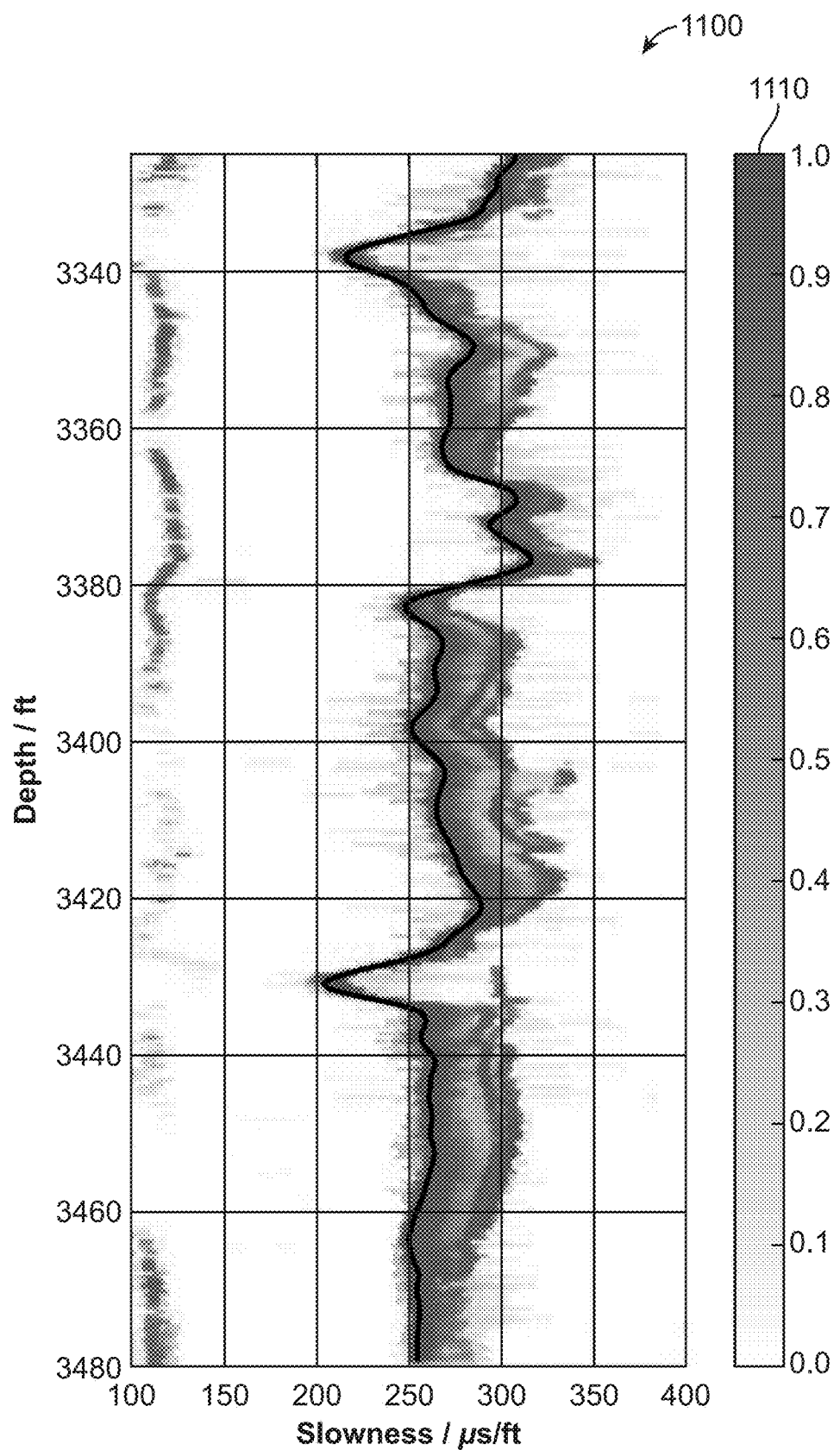
FIG. 11 illustrates a log-scale display of the dispersion processing results of FIG. 10.

FIG. 11 depicts a log-scale display 1100 of the dispersion processing results of FIG. 10. FIG. 11 also includes a VDL 1110, which is a normalized slowness density log used to validate the formation body wave slowness estimates made by the present disclosure. Note that the shear slowness estimates overlay the leading edge of the VDL, suggesting that the shear slowness is well evaluated near its asymptote.

Figure 12:
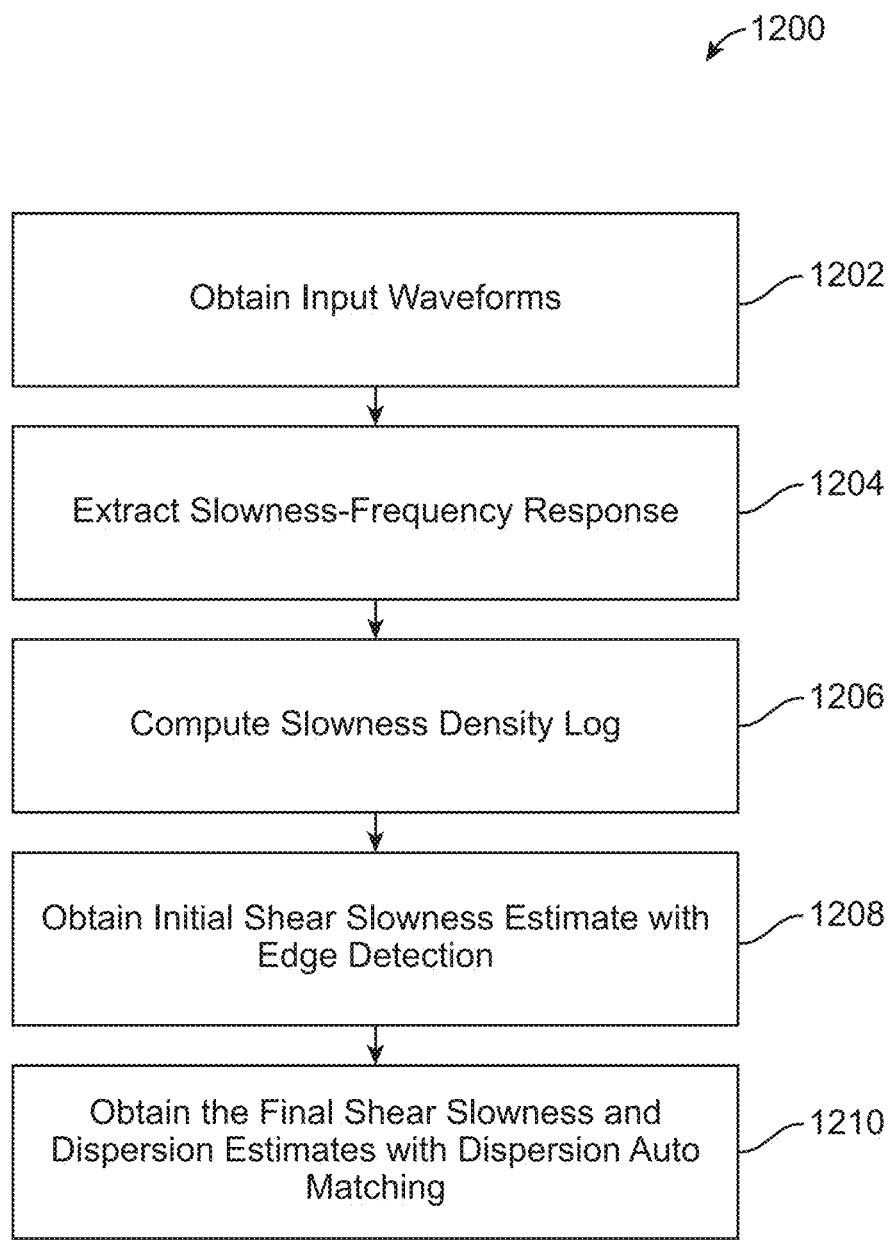
FIG. 12 illustrates an example workflow of the present disclosure.

FIG. 12 illustrates an example workflow 1200 of the present disclosure. First, acoustic waveforms, such as waveform trains 400 of FIG. 4, are received as input waveforms in a step 1202. In some embodiments, pre-processing may be applied to the input waveforms in order to improve or otherwise optimize workflow 1200. The pre-processing can include transforming the input waveforms from the time domain into the frequency domain.

Next, the slowness-frequency response is extracted from the waveforms in a step 1204. In particular, a dispersion analysis is applied to the input array waveforms in order to generate a 2D frequency-slowness coherence/semblance map. In some embodiments, the frequency-slowness coherence/semblance map can have multiple slowness values for each frequency. The desired slowness-frequency response/or dispersion response is then identified for each frequency by tracking the maximum coherence/semblance in the 2D slowness-frequency map.

Using the slowness-frequency response of step 1204, a slowness density log is then calculated in a step 1206, utilizing a sliding window along the slowness axis. The sliding window can be constructed to enclose a box from ($f_{min}$, $f_{max}$) and (s−ds, s+ds) for each given target slowness value s. The slowness density log is then computed by taking a summation of the semblance/coherence values located inside the grid box defined for each target slowness value s in the desired slowness range.

Next, in a step 1208, an initial shear slowness estimate is obtained by applying an edge fitting and detection method to the slowness density log of step 1206. Notably, the slowness density log of step 1206 allows the 2D picking problem of the 2D coherence/semblance map to be simplified into a 1D VDL (variable density log) picking problem—the slowness picking in the 1D VDL is output as the initial shear slowness estimate to step 1210.

Lastly, in a step 1210, the final shear slowness is extracted with a dispersion response auto match inversion, which minimizes the misfit between theoretical dispersion responses (e.g. the initial shear slowness estimate) and actual dispersion measurements from step 1204, in order to evaluate shear slowness at the low-frequency asymptotes of the best theoretical dispersion fits. By utilizing the slowness information from the edge fitting and detection of step 1208, the need to perform a costly and resource intensive global search of all data is obviated. Instead, it is only necessary to search the local minimum of a misfit function nearby to the initial shear slowness estimate, making the real time calculation reasonable and feasible.

Figure 13A:
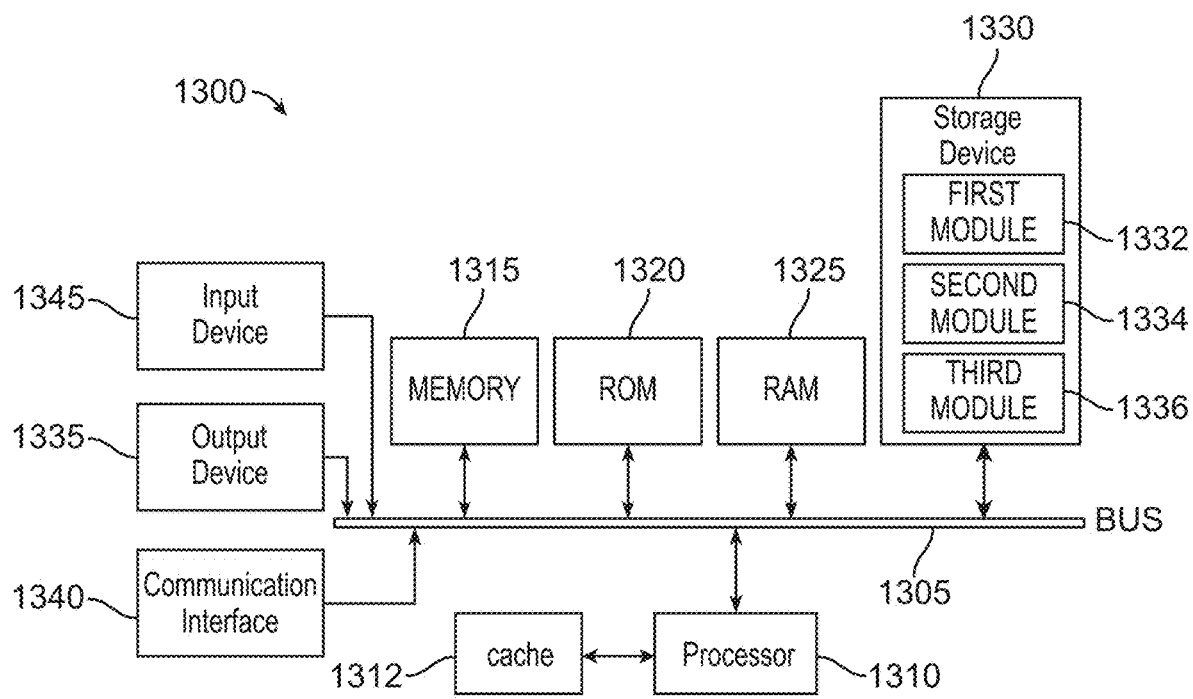
FIG. 13A illustrates an example system bus computing architecture.
Figure 13B:
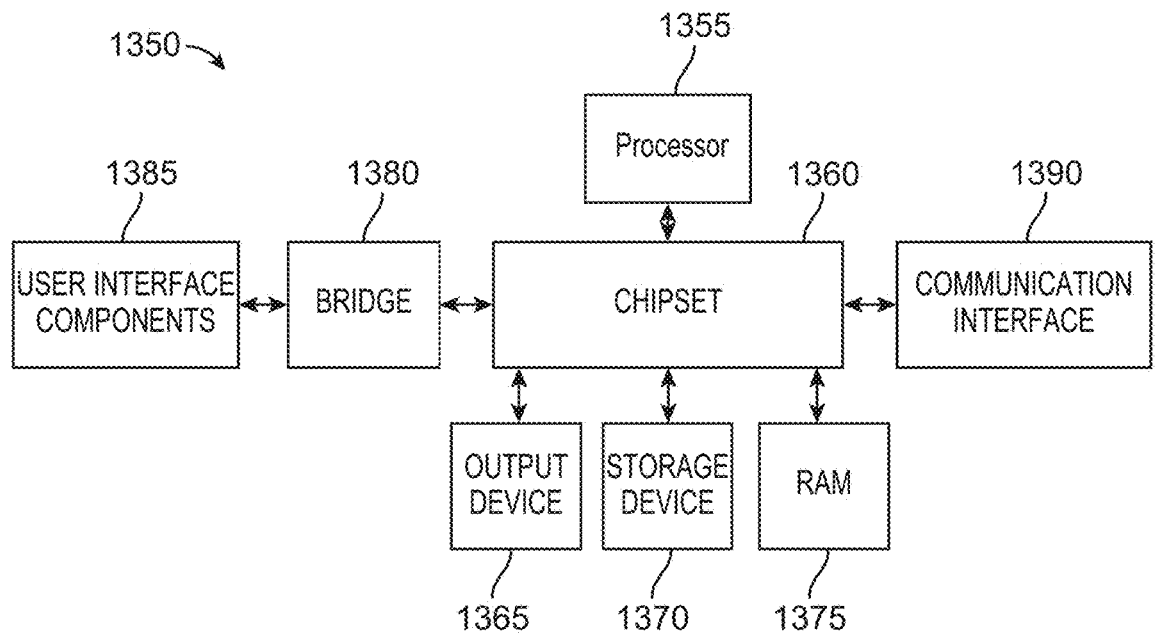
FIG. 13B illustrates an example computer system having a chipset architecture.

FIG. 13A and FIG. 13B illustrate example system embodiments. The more appropriate embodiment will be apparent to those of ordinary skill in the art when practicing the present technology. Persons of ordinary skill in the art will also readily appreciate that other system embodiments are possible.

FIG. 13A illustrates a conventional system bus computing system architecture 1300 wherein the components of the system are in electrical communication with each other using a bus 1305. Exemplary system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates an example computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1355, representative of any number of physically and/or logically distinct resources capable of executing software, firmware, and hardware configured to perform identified computations. Processor 1355 can communicate with a chipset 1360 that can control input to and output from processor 1355. In this example, chipset 1360 outputs information to output device 1365, such as a display, and can read and write information to storage device 1370, which can include magnetic media, and solid state media, for example. Chipset 1360 can also read data from and write data to RAM 1375. A bridge 13130 for interfacing with a variety of user interface components 13135 can be provided for interfacing with chipset 1360. Such user interface components 13135 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1355 analyzing data stored in storage 1370 or 1375. Further, the machine can receive inputs from a user via user interface components 13135 and execute appropriate functions, such as browsing functions by interpreting these inputs using processor 1355.

It can be appreciated that example systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

Statements of the Disclosure Include:

Statement 1: A method, comprising: obtaining, from an acoustic logging tool in a borehole, acoustic waveforms; extracting a slowness-frequency response from the acoustic waveforms, the slowness-frequency response based at least in part upon a dispersion analysis; calculating a slowness density log of the slowness-frequency response; obtaining an initial shear slowness estimate based on the slowness density log; generating a dispersion model comprising one or more model parameters; and performing a dispersion auto match inversion to obtain a final shear slowness estimate, the dispersion auto match inversion based on at least the slowness-frequency response and the dispersion model.

Statement 2: The method of Statement 1, wherein the dispersion auto match inversion is further based on the initial shear slowness estimate and comprises minimizing the difference between the slowness-frequency response and the dispersion model.

Statement 3: The method of Statement 1 or Statement 2, wherein obtaining the final shear slowness estimate comprises calculating the one or more model parameters for a final dispersion model.

Statement 4: The method of Statement 1, wherein obtaining an initial shear slowness estimate further comprises performing edge fitting by: determining a fitting range; minimizing a misfit between an actual edge of the slowness density log and an edge fitting function; and calculating the initial shear slowness estimate based on the minimized misfit.

Statement 5: The method of Statement 1, wherein extracting a slowness-frequency response further comprises generating a 2D coherence/semblance slowness-frequency map of the acoustic waveforms.

Statement 6: The method of Statement 1 or Statement 5, wherein extracting a slowness-frequency response further comprises transforming the acoustic waveforms from the time domain to the frequency domain.

Statement 7: The method of Statements 1, 2, 3, or 4, wherein the one or more model parameters are adjusted to compensate for the influence of one or more formation and borehole parameters on the dispersion model.

Statement 8: The method of Statements 3, 4, 5, 6, or 7, further comprising generating adjusted dispersion models by inserting the one or more model parameters for the final dispersion model into dispersion library, the dispersion library capable of adjusting for different borehole and formation scenarios.

Statement 9: The method of Statements 1, 2, 3, 7, or 8, wherein the dispersion model comprises a theoretical frequency-slowness response.

Statement 10: A system comprising: an acoustic logging tool having an array of receivers configured to acquire acoustic waveforms; and at least one processor in communication with the acoustic logging tool, wherein the processor is coupled with a non-transitory computer-readable storage medium having stored therein instructions which, when executed by the at least one processor, cause the at least one processor to: obtain, from an acoustic logging tool in a borehole, acoustic waveforms; extract a slowness-frequency response from the acoustic waveforms, the slowness-frequency response based at least in part upon a dispersion analysis; calculate a slowness density log of the slowness-frequency response; obtain an initial shear slowness estimate based on the slowness density log; generate a dispersion model comprising one or more model parameters; and perform a dispersion auto match inversion to obtain a final shear slowness estimate, the dispersion auto match inversion based on at least the slowness-frequency response and the dispersion model.

Statement 11: The system of Statement 10, wherein the instructions further cause the at least one processor to perform the dispersion auto match inversion by minimizing the difference between the slowness-frequency response and the dispersion model.

Statement 12: The system of Statement 10 or Statement 11, wherein the instructions further cause the at least one processor to obtain the final shear slowness estimate by calculating the one or more model parameters for a final dispersion model.

Statement 13: The system of Statement 10, wherein the instructions further cause the at least one processor to obtain the initial shear slowness estimate by: determining a fitting range; minimizing a misfit between an actual edge of the slowness density log and an edge fitting function; and calculating the initial shear slowness estimate based on the minimized misfit.

Statement 14: The system of Statement 10, wherein the instructions further cause the at least one processor to generate a 2D coherence/semblance slowness-frequency map of the acoustic waveforms in order to extract the slowness-frequency response.

Statement 15: The system of Statements 10, 11, 12, 13, or 14, wherein the instructions further cause the at least one processor to adjust the one or more model parameters in order to compensate for the influence of one or more formation and borehole parameters on the dispersion model.

Statement 16: A computer-readable device having stored therein instructions which, when executed by at least one processor, cause the at least one processor to perform operations comprising: obtaining, from an acoustic logging tool in a borehole, acoustic waveforms; extracting a slowness-frequency response from the acoustic waveforms, the slowness-frequency response based at least in part upon a dispersion analysis; calculating a slowness density log of the slowness-frequency response; obtaining an initial shear slowness estimate based on the slowness density log; generating a dispersion model comprising one or more model parameters; and performing a dispersion auto match inversion to obtain a final shear slowness estimate, the dispersion auto match inversion based on at least the slowness-frequency response and the dispersion model.

Statement 17: The computer-readable device of Statement 16, wherein the dispersion auto match inversion is further based on the initial shear slowness estimate and comprises minimizing the difference between the slowness-frequency response and the dispersion model.

Statement 18: The computer-readable device of Statements 16 or 17, wherein obtaining the final shear slowness estimate comprises calculating the one or more model parameters for a final dispersion model.

Statement 19: The computer-readable device of Statements 16, 17, or 18, wherein obtaining an initial shear slowness estimate further comprises performing edge fitting by: determining a fitting range; minimizing a misfit between an actual edge of the slowness density log and an edge fitting function; and calculating the initial shear slowness estimate based on the minimized misfit.

Statement 20: The computer-readable device of Statements 16, 17, 18, or 19, wherein the instructions further cause the at least one processor to perform operations comprising generating adjusted dispersion models by inserting the one or more model parameters for the final dispersion model into dispersion library, the dispersion library capable of adjusting for different borehole and formation scenarios.

We claim:

1. A computer-implemented method for real-time determination of one or more geophysical or mechanical properties of an underground formation, the computer-implemented method comprising:

exciting, via at least one transmitter of an acoustic logging tool in a borehole, acoustic signals of different azimuthal orders;

receiving, via a receiver array comprising a plurality of receivers spaced along the acoustic logging tool, different acoustic waveforms containing variations introduced by the one or more geophysical or mechanical properties of the underground formation as the acoustic signals propagate along the borehole, wherein a first receiver of the plurality of receivers is spaced from the at least one transmitter by a first spacing and each receiver of the plurality of receivers is spaced apart by a second spacing;

transmitting, via telemetry sub communicatively coupling the acoustic logging tool and a surface logging facility, the acoustic waveforms received by each of the plurality of receivers of the receiver array to a processor within the surface logging facility;

extracting, via the processor, a slowness-frequency curve from the acoustic waveforms, wherein the slowness-frequency curve is generated based at least in part upon a dispersion analysis, and wherein an axial resolution of the extracted slowness-frequency curve is a function of the second spacing and a size of the receiver array;

calculating, via the processor, a slowness density log of the slowness-frequency curve;

obtaining, via the processor, an initial shear slowness estimate based on the slowness density log, wherein obtaining the initial shear slowness estimate further comprises performing edge fitting by:

determining a fitting range including a shear slowness fitting maximum and a shear slowness fitting minimum, wherein the edge fitting function is $$f(s, \beta) = \rho(s_{max}) \cos^2(s_{max}\beta - s\beta)$$

where $\beta$ denotes a fitting parameter, s is the slowness and $\rho(s)$ is the slowness density log;

minimizing a misfit between an edge of the shear slowness density log and an edge fitting function based on the slowness fitting maximum and the slowness fitting minimum; and calculating the initial shear slowness estimate based on the minimized misfit;

generating, via the processor, a dispersion model comprising a plurality of model parameters;

performing, via the processor, a dispersion auto match inversion to obtain a final shear slowness estimate, wherein the dispersion auto match inversion is performed based on at least the slowness-frequency curve and an estimated slowness-frequency curve simulated by the dispersion model; and displaying a slowness density image based on the final shear slowness estimate that is more representative of the underground formation than the acoustic waveforms.

2. The computer-implemented method of claim 1, wherein the dispersion auto match inversion is further based on the initial shear slowness estimate and comprises minimizing the difference between the slowness-frequency curve and the estimated slowness-frequency curve simulated by the dispersion model dispersion model.

3. The computer-implemented method of claim 1, wherein obtaining the final shear slowness estimate comprises calculating the one or more model parameters for a final dispersion model.

4. The computer-implemented method of claim 1, wherein extracting a slowness-frequency curve further comprises generating a 2D coherence/semblance slowness-frequency map of the acoustic waveforms.

5. The computer-implemented method of claim 1, wherein extracting a slowness-frequency curve further comprises transforming the acoustic waveforms from the time domain to the frequency domain.

6. The computer-implemented method of claim 1, wherein the one or more model parameters are adjusted to compensate for the influence of one or more formation and borehole parameters on the dispersion model.

7. The computer-implemented method of claim 3, further comprising generating adjusted dispersion models by inserting the one or more model parameters for the final dispersion model into dispersion library, wherein the dispersion library can be adjusted for different borehole and formation scenarios.

8. The computer-implemented method of claim 1, wherein the dispersion model comprises a theoretical frequency-slowness response.

9. A system for real-time determination of one or more geophysical or mechanical properties of an underground formation, the system comprising:

an acoustic logging tool having an array of receivers configured to acquire acoustic waveforms, the acoustic logging tool comprising:

at least one transmitter for transmitting acoustic signals of different azimuthal orders;

a receiver array comprising a plurality of receivers spaced along the acoustic logging toll for receiving different acoustic waveforms containing variations introduced by the one or more geophysical or mechanical properties of the underground formation as the acoustic signals propagate along the borehole, wherein a first receiver of the plurality of receivers is spaced from the at least one transmitter by a first spacing and each receiver of the plurality of receivers is spaced apart by a second spacing;

a telemetry sub communicatively coupling the acoustic logging tool and a surface logging facility, the telemetry sub configured to send the acoustic waveforms received by each of the plurality of receivers of the receiver array to at least one processor within the surface logging facility, and wherein an axial resolution of the extracted slowness-frequency curve is a function of the second spacing and a size of the receiver array; and at least one non-transitory computer-readable storage medium having stored therein instructions which, when executed by the at least one processor, cause the at least one processor to:

obtain, from an acoustic logging tool in a borehole, acoustic waveforms;

extract a slowness-frequency curve from the acoustic waveforms, wherein the slowness-frequency curve is generated based at least in part upon a dispersion analysis;

calculate a slowness density log of the slowness-frequency curve;

obtain an initial shear slowness estimate based on the slowness density log;

perform edge fitting to obtain the initial shear slowness estimate by:

determining a fitting range including a slowness fitting maximum and a slowness fitting minimum, wherein the edge fitting function is $$f(s, \beta) = \rho(s_{max})\cos^2(s_{max}\beta - s\beta)$$

where denotes a fitting parameter, s is the slowness and $\rho(s)$ is the slowness density log;

minimizing a misfit between an edge of the slowness density log and an edge fitting function based on the slowness fitting maximum and the slowness fitting minimum; and calculating the initial shear slowness estimate based on the minimized misfit;

generate a dispersion model comprising a plurality of model parameters; and perform a dispersion auto match inversion to obtain a final shear slowness estimate, wherein the dispersion auto match inversion is performed based on at least the slowness-frequency curve and the estimated slowness-frequency curve simulated by the dispersion model; and displaying a slowness density image based on the final shear slowness estimate that is more representative of the underground formation than the acoustic waveforms.

10. The system of claim 9, wherein the instructions further cause the at least one processor to perform the dispersion auto match inversion by minimizing the difference between the slowness-frequency curve and the estimated slowness-frequency curve simulated by dispersion model.

11. The system of claim 9, wherein the instructions further cause the at least one processor to obtain the final shear slowness estimate by calculating the one or more model parameters for a final dispersion model.

12. The system of claim 9, wherein the instructions further cause the at least one processor to generate a 2D coherence/semblance slowness-frequency map of the acoustic waveforms in order to extract the slowness-frequency curve.

13. The system of claim 9, wherein the instructions further cause the at least one processor to adjust the one or more model parameters in order to compensate for the influence of one or more formation and borehole parameters on the dispersion model.

14. A non-transitory computer-readable device having stored therein instructions which, when executed by at least one processor, cause the at least one processor to perform operations for real-time determination of one or more geophysical or mechanical properties of an underground formation, the operations comprising:

exciting, via at least one transmitter of an acoustic logging tool in a borehole, acoustic signals of different azimuthal orders;

receiving, via a receiver array comprising a plurality of receivers spaced along the acoustic logging tool, different acoustic waveforms containing variations introduced by the one or more geophysical or mechanical properties of the underground formation as the acoustic signals propagate along the borehole, wherein a first receiver of the plurality of receivers is spaced from the at least one transmitter by a first spacing and each receiver of the plurality of receivers is spaced apart by a second spacing;;

transmitting, via a communicative coupling between the acoustic logging tool and a surface logging facility, the acoustic waveforms received by each of the plurality of receivers of the receiver array to a processor within the surface logging facility;

extracting a slowness-frequency curve from the acoustic waveforms, wherein the slowness-frequency curve is generated based at least in part upon a dispersion analysis, and wherein an axial resolution of the extracted slowness-frequency curve is a function of the second spacing and a size of the receiver array;

calculating a slowness density log of the slowness-frequency curve;

obtaining an initial shear slowness estimate based on the slowness density log, wherein obtaining the initial shear slowness estimate further comprises performing edge fitting by:

determining a fitting range including a slowness fitting maximum and a slowness fitting minimum, wherein the edge fitting function is $$f(s, \beta) = \rho(s_{max})\cos^2(s_{max}\beta - s\beta),$$

where $\beta$ denotes a fitting parameter, s is the slowness and $\rho(s)$ is the slowness density log;

minimizing a misfit between an edge of the slowness density log and an edge fitting function based on the slowness fitting maximum and the slowness fitting minimum; and calculating the initial shear slowness estimate based on the minimized misfit;

generating a dispersion model comprising a plurality of model parameters;

performing a dispersion auto match inversion to obtain a final shear slowness estimate, wherein the dispersion auto match inversion is performed based on at least the slowness-frequency curve and an estimated slowness-frequency curve simulated by the dispersion model dispersion model; and displaying a slowness density image based on the final shear slowness estimate that is more representative of the underground formation than the acoustic waveforms.

15. The non-transitory computer-readable device of claim 14, wherein the dispersion auto match inversion is further based on the initial shear slowness estimate and comprises minimizing the difference between the slowness-frequency curve and the estimated slowness-frequency curve simulated by dispersion model.

16. The non-transitory computer-readable device of claim 14, wherein obtaining the final shear slowness estimate comprises calculating the one or more model parameters for a final dispersion model.

17. The non-transitory computer-readable device of claim 16, wherein the instructions further cause the at least one processor to perform operations comprising generating adjusted dispersion models by inserting the one or more model parameters for the final dispersion model into dispersion library, wherein the dispersion library can be adjusted for different borehole and formation scenarios.

\* \* \* \* \*